(12) United States Patent
Hansen et al.

(10) Patent No.: US 7,103,018 B1
(45) Date of Patent: Sep. 5, 2006

(54) METHOD OF AND A NETWORK FOR HANDLING WIRELESS SESSION PROTOCOL (WSP) SESSIONS

(75) Inventors: Hans Hansen, Copenhagen (DK); Lars Hansen, Copenhagen (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/674,329

(22) PCT Filed: Apr. 27, 1999

(86) PCT No.: PCT/EP99/02844

§ 371 (c)(1),
(2), (4) Date: Dec. 22, 2000

(87) PCT Pub. No.: WO99/56431

PCT Pub. Date: Nov. 4, 1999

(30) Foreign Application Priority Data

Apr. 28, 1998 (DK) .................................... 0581/98

(51) Int. Cl.
*H04Q 7/00* (2006.01)
*H04Q 7/20* (2006.01)
*G06F 15/16* (2006.01)

(52) U.S. Cl. ...................... 370/328; 709/217; 709/227; 455/426.1

(58) Field of Classification Search ................ 370/230, 370/235–236, 329, 338, 352, 401, 410, 328; 709/217–219, 222–223, 225, 227–229, 242; 455/426.1

See application file for complete search history.

(56) References Cited

U.S. PATENT DOCUMENTS

| 5,732,214 | A | * | 3/1998 | Subrahmanyam | ........... 709/227 |
| 5,764,899 | A | * | 6/1998 | Eggleston et al. | .......... 709/203 |
| 5,958,006 | A | * | 9/1999 | Eggleston et al. | .......... 709/219 |
| 6,065,120 | A | * | 5/2000 | Laursen et al. | ............. 713/201 |
| 6,101,531 | A | * | 8/2000 | Eggleston et al. | .......... 709/206 |
| 6,718,389 | B1 | * | 4/2004 | Navarre et al. | ............. 709/227 |
| 6,775,671 | B1 | * | 8/2004 | de Lara et al. | ............... 707/10 |

* cited by examiner

*Primary Examiner*—Hassan Kizou
*Assistant Examiner*—Hong Sol Cho
(74) *Attorney, Agent, or Firm*—Foley & Lardner, LLP

(57) ABSTRACT

A communication terminal initiates a Wireless Session Protocol (WSP) session by forwarding a request of data to a server. The request comprises an identification of the requested data and a communication terminal identification number provided by the server. The server, when receiving a request containing a communication terminal identification number, recalls user profile information from an associated database memory corresponding to said communication terminal identification number. The user profile information indicates a data format which will be handled by the communication terminal. Then the server replies to the request by forwarding the requested data in the format defined by the user profile information.

21 Claims, 2 Drawing Sheets

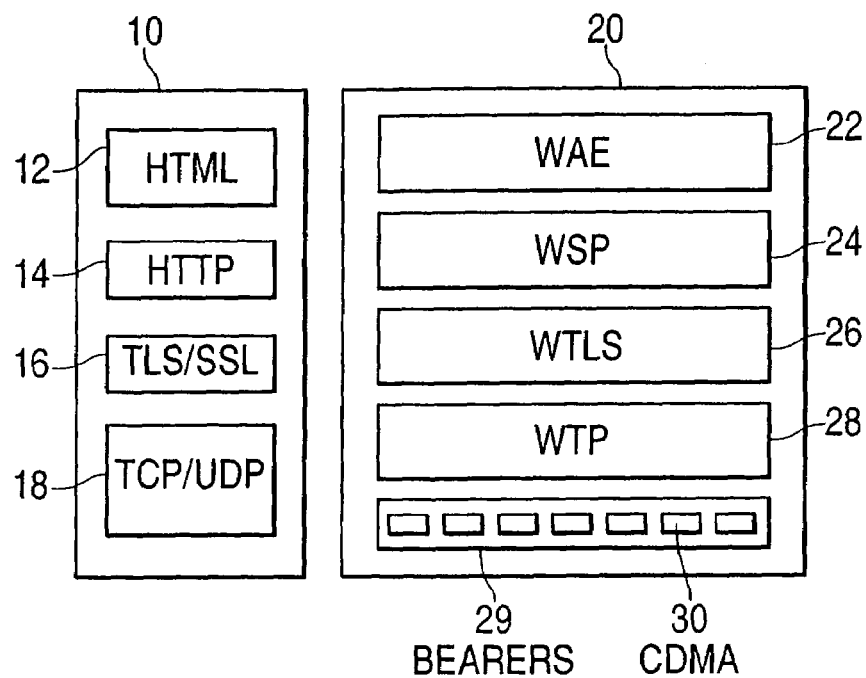
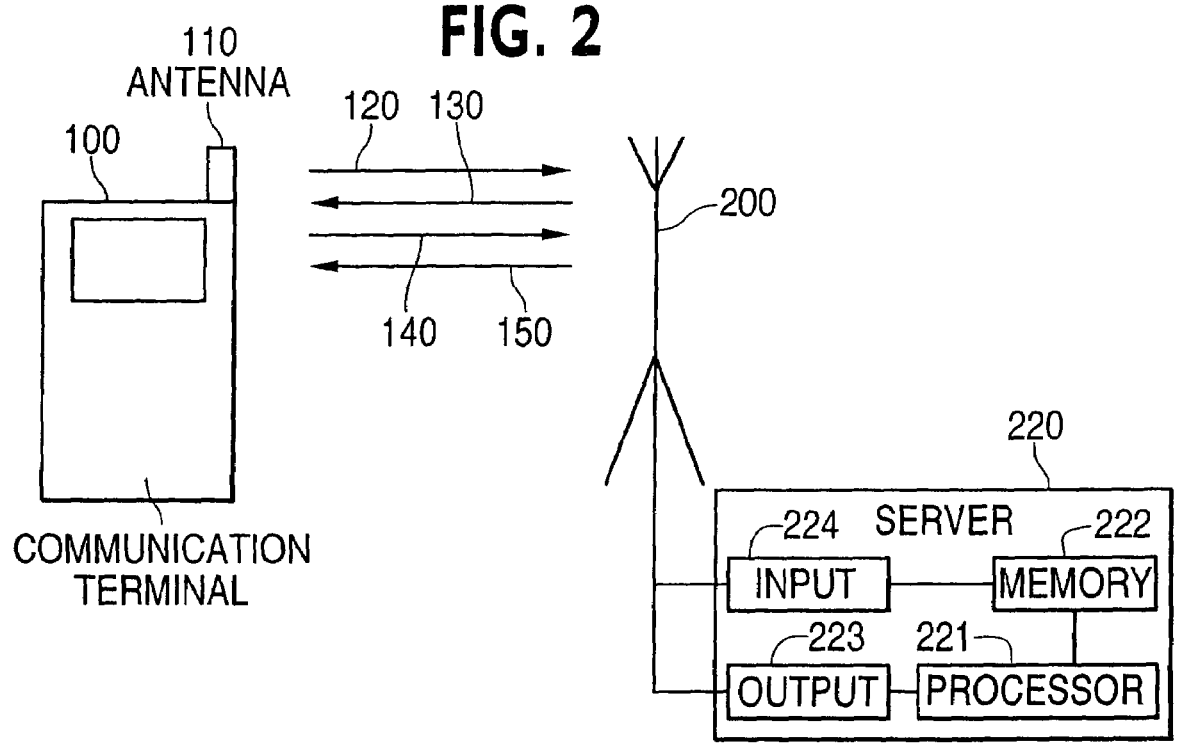

METHOD OF AND A NETWORK FOR HANDLING WIRELESS SESSION PROTOCOL (WSP) SESSIONS

BACKGROUND OF THE INVENTION

1. Field of the Invention

The invention relates to a new method and system for a session service in a wireless session protocol (WSP) between a user and a server terminal.

2. Description of the Prior Art

The Wireless Application Protocol (WAP) is a result of continuous work to define an industry wide standard for developing applications over wireless communication networks. WAP is disclosed in the Wireless Application Protocol Architecture Specification; Version 30 Apr. 1998; by Wireless Application Protocol Architecture Working Group;

The scope for the WAP working groups is to define a set of standards to be used by service applications. The wireless market is growing very quickly, and reaching new customers and services. To enable operators and manufacturers to meet the challenges in advanced services, differentiation and fast/flexible service creation WAP defines a set of protocols in transport, session and application layers.

The Session layer protocol family in the WAP architecture is called the Wireless Session Protocol, WSP. WSP provides the upper-level application layer of WAP with an interface for session services and management. One example of a session service is a connection-mode service that operates above a transaction layer protocol called Wireless Transport Layer (WTP), See also Wireless Application Protocol: Wireless Transport Protocol specification, version 30 Apr. 1998, by Wireless Application Protocol Transport Working Group.

Another session service may be a connectionless service that operates above a secure or non-secure datagram service.

The Wireless Session Protocol comprises one protocol most suited for browsing applications (WSP/B). WSP/B provides HTTP 1.1 functionality and incorporates new features such as long-lived sessions, a common facility for data push, capability negotiation, and session suspend/resume. HTTP 1.1 is disclosed in Fielding, R., et. al., "Hypertext Transfer Protocol—HTTP/1.1", RFC 2068, UC Irvine, January 1997. The protocols in the WSP family are optimized for low bandwidth bearer networks with relatively long latency.

The WAP Architecture is very similar to the Internet Architecture. FIG. 1 shows a comparison between the Internet Architecture 10 and the WAP Architecture 20. The Internet Architecture 10 comprises a Hypertext Markup Language (HTML) 12, e.g. Java Script, a Hypertext Transfer Protocol (HTTP) 14, Transport Layered Security (TLS)/Secure Sockets Layer (SSL) 16, and a Transport Configuration Protocol (TCP)/User Datagram Protocol (UDP) 18. The Internet Architecture 10 is a well known prior art, and is disclosed e.g. in U.S. Pat. No. 5,657,390. The WAP Architecture 20 comprises a Wireless Application Protocol (WAE) 22 corresponding to HTML 12, a Wireless Session Layer (WSP) 24 corresponding to HTTP 14, a Wireless Transport Layered Security (WTLS) 26 corresponding to TLS/SSL 16, and a Wireless Transport Layer (WTP) 28 corresponding to TCP/UDP 18. Further, the WAP Architecture comprises different bearers 29 like e.g. SMS, USSD and CODMA 30. There is also a possibility to implement different kinds of services and applications in the WAP Architecture, for example, Value Added Services (VAS). The WAP Architecture 20 is a well known prior art and more information about the different blocks WAE, WSP, WTLS, WTP and bearers is found in on the Internet.

The present invention relates to WSP, which provides a means for organized exchange of content between co-operating client/server applications. Specifically, it provides the applications with a means to:

a) establish an optionally secure, reliable session from client to server, and release the session in an orderly manner;

b) exchange content between client and server; and c) suspend and resume the session.

In addition, WSP also supports a non-confirmed session service. The connectionless session service can be used over unreliable transport when applications do not care about confirmation. The non-confirmed service is accessed outside the context of an established session.

In, for example, the GSM system it is relatively expensive to transfer data. At the same time it is desired to reduce the size of the required memory space in the phone.

EP-A2-0,851,696 discloses a way of providing data from an information database in response to a request from a mobile station in a wireless network, by using short messaging service, SMS. The subscriber uses a mobile station to place a call via the wireless network and a PSTN to an information service provider. An identification (ID) of the mobile station is forwarded to the information service provider. That provider can then use the ID to retrieve a user personal identification number (PIN) or user identification number. The database information service provider constructs a message containing the desired data and the appropriate PIN or user ID number and forwards that to a message center. The message center then forwards the data from the provider to the mobile station as an SMS.

However, EP-1-0,851,696 uses the ID every time it retrieves a user PIN or user ID number. Thus, this procedure has to be repeated every time when the user sends a request to the server. This means that it will not be easier or faster when the user would like to establish another session. This is a major drawback since the cost for a call will then increase. Also, this document does not describe how it is possible to support different types of data formats/types, upon sending/receiving a request. One example of a data format/type supported by WAP is the MIME multipart format, which transports composite data objects (for example, multipart/mixed). See WAP WSP draft version 2 Apr. 1998, 7.4 Multipart data. WSP defines a compact binary form of the MIME multipart entity and the content type. Thus, there is a need to support different data formats of a WSP session, and to increase the speed to establish a session.

SUMMARY OF THE INVENTION

WO/A2/98/34414 discloses a communication system providing a subscriber unit (for example, a portable phone) with access to an information network through gateway equipment that is coupled to a network server. The network server conveys data to the subscriber unit, as a respond to a request sent by the subscriber unit, via an SMS message. The request includes an identifier, which is used to communicate with the originating communication device via a message service (SMS) that provides external access to the radio communication system. The information network may be a public access network, such as the Internet, comprising world wide web (www) information sites.

However, as in EP-A2-0,851,696, the system in WO/A2/98/34414 has to repeat its procedure every time the user sends a request to the server. Thus, it will neither be easier or faster when the user would like to establish another session, that is, it will establish the session as it usually does. In other words, the network has to identify the user every time the user would like to obtain data.

EP-A2-0,833,313 discloses a method and a system for transferring data from an Internet Protocol (IP) network to a mobile station in a non-IP network. A special server acts as an interface between the Internet and a CDPD network. The mobile station could be a mobile phone, and the server is a software platform. The system permits the user to communicate with a data network while either in an idle mode or while in a voice mode.

The invention provides a method of handling Wireless Session Protocol (WSP) sessions in such a way that the amount of redundant information is reduced.

This is obtained by a method of handling Wireless Session Protocol (WSP) sessions between a wireless communication terminal and a corresponding server, wherein the communication terminal initiates a session by forwarding a request of data to the server, said requests comprises an identification of the requested data and a communication terminal identification number provided by the server; the server, when receiving a request containing a communication terminal identification number, recalls user profile information from an associated database memory corresponding to said communication terminal identification number, and said user profile information indicates a data format which shall be handled by the communication terminal; and the server replies to the request by forwarding the requested data in the format defined by the user profile information. Hereby the server unit is able to store the user profile information for a period and to recall this information when appropriate. The requesting communication unit does not have to transmit information about its user profile once these are stored in the database memory of the server. This information would otherwise have to be transferred in every session, and this would lead to an unacceptable overhead with up to 50 percent of data transferred in the request being redundant user profile information. Once the server has stored the user profile information it provides the communication terminal with a communication terminal identification number that uniquely identifies the communication terminal.

According to the preferred embodiment of the invention the server only stores the user profile information for a predetermined period of time, for example, 3 hours or 3 days. The period of time may be differentiated in dependence of the kind of subscription the user has. The server deletes the user profile information from the database memory upon expiration of said period of time. In order to avoid double use of the same communication terminal identification number the server informs the communication terminal about the duration of this period, whereby the terminal knows when the period has expired. When the period has expired and the communication terminal starts a new session it has to transfer the user profile once more. When the server has stored the user profile information once more it provides the communication terminal with a new communication terminal identification number that uniquely identifies the communication terminal for a new period.

The invention furthermore relates to a method of handling Wireless Session Protocol (WSP) sessions between a wireless communication terminal and a corresponding server, wherein: the communication terminal initiates a session by forwarding a request of data to the server, said request comprises an identification of the requested data and a header indicating the data format which shall be handled by the communication terminal; the server upon receipt of a request generates a communication terminal identification number and stores said header associated with said communication terminal identification number; said server replies to the request by forwarding the requested data and the communication terminal identification number to the requesting communication terminal; said communication terminal stores the communication terminal identification number in a memory. The server stores the user profile information included in the header and this information may be used later when a new session is initiated.

The invention furthermore relates to a wireless communication network for handling Wireless Session Protocol (WSP) sessions between a wireless communication terminal and a corresponding server connected via said network, comprising means in the communication terminal for initiating a session by forwarding a request of data to the server, said request comprises an identification of the requested data and a communication terminal identification number provided by the server; a database memory connected to the server in order to store user profile information based on the communication terminal identification number received in the request, said user profile information indicates the data format which may be handled by the communication terminal; processing means in order to recall the stored user profile information corresponding to the communication terminal identification number and for replying to the request by forwarding the requested data in the format defined by the user profile information via transmission means to the communication terminal. Such a network will be especially useful when it is used as a cellular network, for example, a GSM network and the bearer for the request is the standard data transfer or a chain of SMS messages. The savings in cost for a sessions will be important for the user since the saving of the re-transmission of resending the user profile information several times may reduce the number of transmitted messages by up to 50%.

When the communication unit is aware that the user profile information is not stored in the database memory of the server, it has to include a header in the request indicating the data format which will be handled by the communication terminal. The processing means in the server is arranged to derive the user profile information from the header, to store the user profile information in said database memory, to generate an associated communication terminal identification number; and to forward the communication terminal identification number via said transmission means to the communication terminal. This communication terminal identification number will be valid for the next session if that occurs within the period set by the server.

According to the invention a server unit is provided for use in a wireless communication network for supporting Wireless Session Protocol (WSP) sessions, comprising input means; output means; and processing means controlling the input and output means and a database memory. The database memory contains user profile information for a plurality of communication terminals, said user profile information indicates the data format which may be handled by the communication terminal. The input means are adapted to receive a request for data from a communication terminal, said request initiates a session and comprises an identification of the requested data and a communication terminal identification number. The processing means recalls the stored user profile information by means of the communication terminal identification number received in the request, and the processing means replies to the request by forwarding the requested data in the format defined by the user profile information via said output means. Very often it will be the network operator to which a phone user subscribes that operates the WSP server, too. In practice it can occur that it is the network server that generates the communication terminal identification number to the WSP server, but as far as both the network server and the WSP server are controlled by the same operator these servers may be regarded as are entity. This is also the case when the WSP server operator decides to use communication terminal identification numbers otherwise existing in the system.

When the communication terminal includes a header in the request indicating the data format which may be handled, the processing means of the server has to derive the user profile information from the header, to store the user profile information in said database memory, and to generate an associated communication terminal identification number. Furthermore the processing means forwards the communication terminal identification number via said output means to the communication terminal.

BRIEF DESCRIPTION OF THE DRAWINGS

The invention will be described in greater detail in the following by way of example only and with reference to the attached drawings, in which FIG. 1 shows a comparison between the Internet Architecture and the WAP Architecture;

FIG. 2 schematically shows a connection between a communication terminal and a server according to a preferred embodiment according to the present invention.

DESCRIPTION OF THE PREFERRED EMBODIMENT

Figure 3:
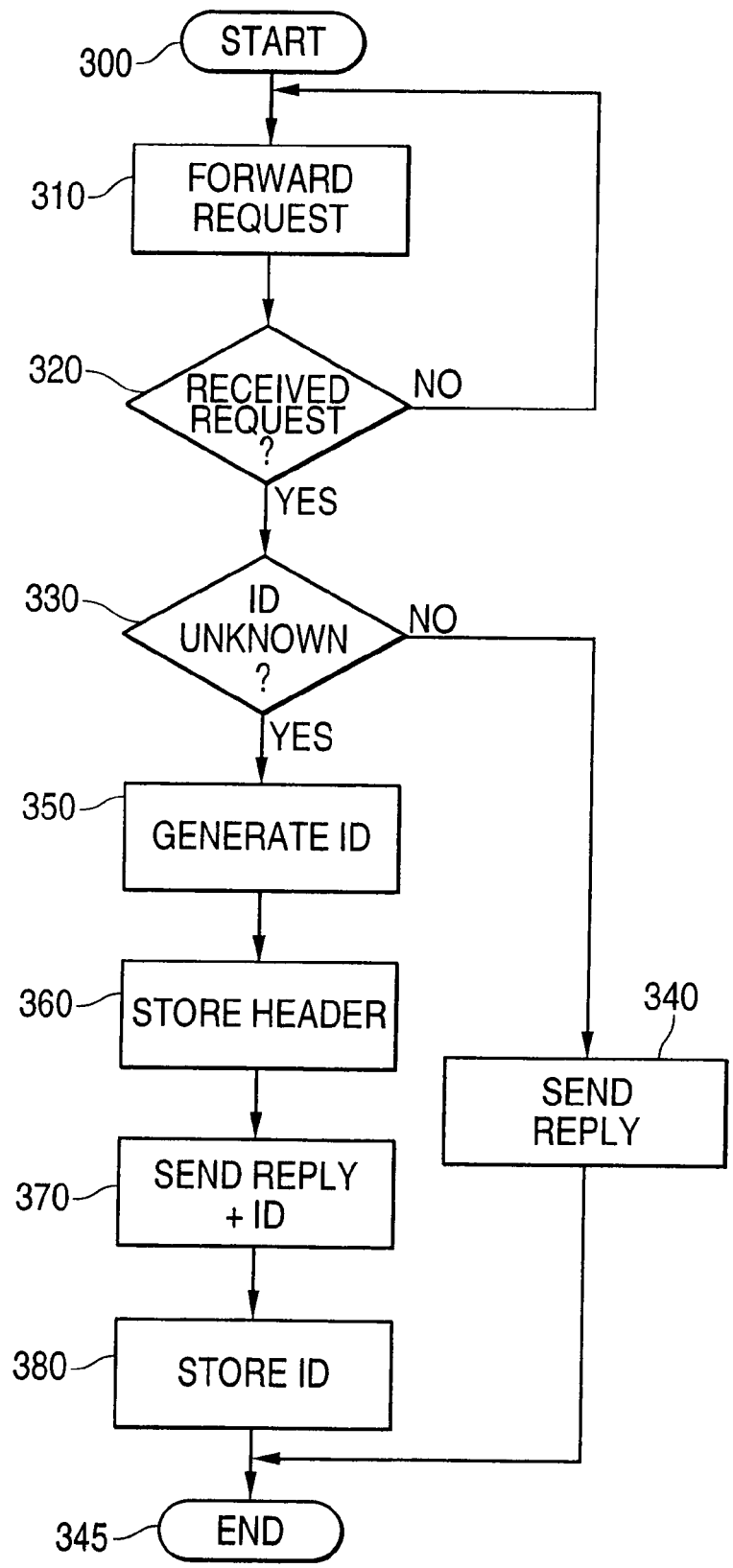
FIG. 3 shows a flowchart over the establishment of a session according to a preferred embodiment according to the present invention.

FIG. 2 shows a wireless communication network for handling Wireless Session Protocol (WSP). The network comprises a wireless communication terminal 100, comprising an antenna 110, and an server 220 connected to a server antenna 200. The communication terminal 100 is for example an ordinary cellular phone provided with a Wireless Application Protocol (WAP). The server is provided by an operator and can handle WAP applications. The WAP comprises WSP on which the present invention is based. How WSP is implemented in WAP is described in detail in the Wireless Application Protocol Architecture Specification; Version 0.9; by Wireless Application Protocol Architecture Working Group found on the Internet.

The server 220 includes processing means 221 or a CPU controlling the activity of the server 220. The server 220 will in general be sited at a network operator and therefore not be directly connected to the antenna. However, the hardware between the server 220 and the antenna is not important to understand the invention and these parts are therefore omitted to improve the clarity of the invention. The server receives the request via input means 224. The processing means 221 looks for a heading containing user profile information or a communication terminal identification number in the request.

If the request contains a heading containing user profile information this information is stored in a database memory 222 for use when the server 220 replies. If the request contains a communication terminal identification number, the corresponding user profile information is recalled from the database memory 222 when the request is replied to. When the server 220 is ready for responding, the processing means 221 transmits the response via output means 223 to the communication terminal 100 via said output.

When using a connectionless WSP session, it is not possible to store WSP headers as a part of a session state at both ends of the connection peers, that is the terminal 100 and the server 220. Therefore, all headers must be re-sent every time a WAP user agent requests a resource from the server 220 via a WAP proxy. Over a low bandwidth, high latency bearer, such as Short Messaging Services (SMS), this leads to an unacceptable overhead (only 50–75% of the data sent is pay-load). The present invention solves this problem by using a cookie for storing session headers on the server within the user agent profile (uaprof) resource file defined by WAP. The idea is, that a request of data 120, conveys headers to the server 220, after which the user agent (client) uses a file-handle to reference the information stored on the server. It is also possible for the operator to provide some pre-defined file-handle in the communication terminal, that is, operator has some cookies on the server. Therefore, it is not always necessary for the user agent to define a header, which saves significant time for the user agent.

If the operator has provided some cookies on the server, the method is disclosed by the following steps by reference to FIG. 2:

the communication terminal 100 initiates a session by forwarding a request 120 of data to the server 220, the request 120 comprises an identification of the requested data and a communication terminal identification number provided by the server 220;

the server 220, when receiving the request 120 containing a communication terminal identification number, recalls user profile information from an associated database memory (not shown) corresponding to the communication terminal identification number, and said user profile information indicates a data format which will be handled by the communication terminal 100; and the server 220 replies 130 to the request by forwarding the requested data 120 in the format defined by the user profile information.

The communication terminal can initiate a session comprising a header in a request 140 indicating the data format which can be handled by the communication terminal 100;

the server 220, when receiving the request 140 containing a header, can derive the user profile information from this header and store the user profile information in said database memory and generate an associated communication terminal identification number; and the server 220 can forward the communication terminal identification number in a reply 150 to the communication terminal 100.

As an alternative method of the invention, which does not require the server to have pre-defined cookies, is disclosed by the following steps by reference to FIG. 2:

the communication terminal 100 initiates a session by forwarding a request 140 of data to the server 220, the request 140 comprises an identification of the requested data and a header indicating the data format which shall be handled by the communication terminal 100;

the server 220 upon receipt of the request 140 generates a communication terminal identification number and stores said header associated with said communication terminal identification number;

said server 220 replies 150 to the request by forwarding the requested data and the communication terminal identification number to the requesting communication terminal 100;

the communication terminal 100 stores the communication terminal identification number in a memory (not shown).

Further, when the communication terminal 100 once again initiates a session, and forwards a request 120 of the same data as in the first step, the request 120 includes an identification of the requested data and the communication terminal identification number received from the server 220. When the server 220 receives the request 120, it recalls the header from the database memory which corresponds to said communication terminal identification number, and replies 150 to the communication terminal 100.

In both of the methods it is possible for the server to define a period of time in which the user profile information can be stored in the database memory. It is also possible for the server to delete the user profile information from the database memory upon expiration of the defined period of time. The time may for example be 3 hours or 3 days. The period of time may be differentiated in dependence of the kind of subscription the user has. In order to avoid double use of the same communication terminal identification number, the server informs the communication terminal about the duration of this period, whereby the terminal knows when the period has expired. When the period has expired and the communication terminal starts a new session, it has to transfer the user profile once more. When the server has stored the user profile information once more it provides the communication terminal with a new communication terminal identification number that uniquely identifies the communication terminal for a new period.

The header data structure used by the terminal and the server comprises a sequence of header fields, followed by, for example, image-type-specific data and actual image data. The header field comprises an image type identifier of a multi-byte length (TypeField), an octet of general header information (FixHeaderField), followed by zero or more extension header fields (ExtField). The extension headers may be of type binary 00 through binary 11. A header of Type 00 could, for example, indicate a multi-byte bitfield used to specify additional header information. The first bit may be set if a type 00 extension header is set if more data follows. A header of the Type 11 indicates a sequence of parameter/value pairs. These can be used for optimizations and special purpose extensions, for example, animation image formats. The "parameter size" tells the length (1–8 bytes) of the following parameter name. The "value size" gives the length (1–16 bytes) of the following parameter value. The concatenation flag indicates whether another parameter/value pair will follow after reading the specified bytes of data. The actual organization of the image data depends on the image type.

FIG. 3 shows an example of the establishment of a session in accordance with the present invention. The session uses the Wireless Session Protocol, which is to be established between a wireless communication terminal and a corresponding server, START 300. The communication terminal initiates a session by forwarding a request of data to the server, "FORWARD REQUEST" 310. This request comprises an identification of the requested data and a header indicating the data format, which shall be handled by the communication terminal. If the server does not receive the request, it could be possible to forward a new request, "RECEIVED REQUEST?" 320. When the server has received the request, the server can check whether the identification is recognized or not, "ID UNKNOWN" 330, that is, if the identification has been stored on the server as a communication terminal identification number or not. If the identification of the terminal is recognized, then the server recalls user profile information from an associated database memory corresponding to the communication terminal identification number. The user profile information indicates a data format which shall be handled by the communication terminal. The server sends a reply to the request by forwarding the requested data in the format defined by the user profile information, "SEND REPLY" 340. Thereafter, the session can be ended by the user, "END" 345.

If the identification of the terminal is not recognized, "ID UNKNOWN" 330, then the server upon receipt of the request generates a communication terminal identification number, "GENERATE ID" 350. Thereafter, the server stores the header associated with said communication terminal identification number, "STORE HEADER" 360. The server replies to the request by forwarding the requested data and the communication terminal identification number to the requesting communication terminal, "SEND REPLY+ID" 370. Finally, the communication terminal stores the communication terminal identification number in a memory, "STORE ID" 380. Thereafter, the user may choose to end the session, "END" 345.

Once the communication terminal identification number has been stored, "STORE ID" 380, it can be possible for the communication terminal to initiate further sessions, by simply forwarding a request to the server which may include both an identification of the requested data and the communication terminal identification number received from the server. Then it would be possible for the server, upon reception of a request, to recall the header from the database memory which corresponds to the communication terminal identification number.

The invention is not limited to the above described and in the drawing shown of an example of embodiments but can be varied within the scope of the appended claims.

What is claimed is:

1. A method of handling Wireless Session Protocol (WSP) sessions between a wireless communication terminal and a corresponding server, wherein:

the communication terminal initiates a session by forwarding a request for earlier requested data to the server, comprising an identification of the earlier requested data and a communication terminal identification number provided by the server;

the server, when receiving a request containing the earlier requested data and the communication terminal identification number, recalls user profile information from an associated database memory corresponding to said communication terminal identification number, and said user profile information indicates a data format which will be handled by the communication terminal for the earlier requested data; and the server replies to the request for earlier requested data by forwarding the earlier requested data in the format defined by the user profile information.

2. A method according to claim 1, wherein the wireless communication terminal initiates a session comprising a header in a request indicating the data format which will be handled by the communication terminal;

said server, when receiving the request containing a header, derives the user profile information from the header and stores the user profile information in said database memory and generates an associated communication terminal identification number; and said server forwards the communication terminal identification number to the communication terminal.

3. A method according to claim 2, wherein the server defines a period of time in which the user profile information is stored in the database memory.

4. A method according to claim 3, wherein the server deletes the user profile information from the database memory upon expiration of said period of time.

5. A method according to claim 1, wherein the server defines a period of time in which the user profile information is stored in the database memory.

6. A method according to claim 5, wherein the server deletes the user profile information from the database memory upon expiration of said period of time.

7. A method of handling Wireless Session Protocol (WSP) sessions between a wireless communication terminal and a corresponding server, wherein:
the wireless communication terminal initiates a session by forwarding a request for earlier requested data to the server, said request comprises an identification of the earlier requested data and a header indicating the data format which will be handled by the communication terminal;
the server upon reception of the request for earlier requested data generates a communication terminal identification number and stores said header associated with said communication terminal identification number;
said server replies to the request for earlier requested data by forwarding the earlier requested data and the communication terminal identification number to the requesting communication terminal; and
said wireless communication terminal stores the communication terminal identification number in a memory.

8. A method according to claim 7, wherein the wireless communication terminal, when subsequently initiating a session, forwards a request to the server, said request includes an identification of the requested data and the communication terminal identification number received from the server; and the server upon receipt of the request recalls the header from the database memory which corresponds to said communication terminal identification number.

9. A wireless communication network for handling Wireless Session Protocol (WSP) sessions between a wireless communication terminal and a corresponding server connected via said network, comprising:
means in the communication terminal for initiating a session by forwarding the request for earlier requested data to the server, said request for earlier requested data comprises an identification of the earlier requested data and a communication terminal identification number provided by the server;
a database memory connected to the server in order to store user profile information based on the communication terminal identification number received in the request for earlier requested data, said user profile information indicates the data format which may be handled by the wireless communication terminal; and
processing means for recalling the stored user profile information corresponding to the communication terminal identification number and for replying to the request for earlier requested data by forwarding the earlier requested data in the format defined by the user profile information via transmission means to the communication terminal.

10. A network according to claim 9, wherein:
the wireless communication terminal comprises means for including a header in the request for earlier requested data indicating the data format which will be handled by the wireless communication terminal; and
the processing means in the server is arranged to derive the user profile information from the header, to store the user profile information in said database memory, to generate an associated communication terminal identification number; and to forward the communication terminal identification number via said transmission means to the communication terminal.

11. A network according to claim 10, wherein the server comprises a timer and said processing means sets a period of time in which the user profile information is stored in the database memory.

12. A network according to claim 11, wherein the processing means, upon expiration of said period of time, deletes the user profile information from the database memory.

13. A server unit for use in a wireless communication network for supporting Wireless Session Protocol (WSP) sessions, comprising:
input means;
output means;
processing means controlling the input and output means and a database memory;
said database memory contains user profile information for a plurality of wireless communication terminals, said user profile information indicates the data format which may be handled by the communication terminal;
said input means are adapted to receive a request for earlier requested data from a wireless communication terminal, said request initiates a session and comprises an identification of the earlier requested data and a communication terminal identification number;
said processing means recalls the stored user profile information by means of the communication terminal identification number received in the request for earlier requested data; and
said processing means replies to the request for earlier requested data by forwarding the earlier requested data in the format defined by the user profile information via said output means.

14. A server according to claim 13, wherein said wireless communication terminal includes a header in the request of earlier requested data indicating the data format which may be handled by the wireless communication terminal, wherein:
the processing means derives the user profile information from the header, stores the user profile information in said database memory, and generates an associated communication terminal identification number; and
said processing means forwards the communication terminal identification number via said output means to the communication terminal.

15. A server according to claim 14, comprising a timer, and wherein said processing means sets a period of time in which the user profile information is stored in the database memory.

16. A server according to claim 15, wherein the processing means, upon expiration of said period of time, deletes the user profile information from the database memory.

17. A server according to claim 13, comprising a timer, and wherein said processing means sets a period of time in which the user profile information is stored in the database memory.

18. A server according to claim 17, wherein the processing means, upon expiration of said period of time, deletes the user profile information from the database memory.

19. A wireless communication terminal for use in a wireless communication network for supporting Wireless Session Protocol (WSP) sessions with a server for providing the wireless communication terminal with a communication terminal identification number, associated with a database that stores user profile information based on the communication terminal identification number, said user profile information indicating a data format to be handled by the wireless communication terminal, the wireless communication terminal comprising:

an antenna; and means for forwarding to the server a request of earlier requested data, said request not having an indication of a data format which will be handled by the wireless communication terminal, said request comprising an identification of the earlier requested data and the communication terminal identification number; and wherein the wireless communication terminal is configured to receive from the server a reply to the request for earlier requested data in a format defined by the user profile information corresponding to the communication terminal identification number.

20. A terminal according to claim 19 wherein:

the wireless communication terminal initiates the earlier request for data by forwarding a request for data to the server comprising an identification of the requested data and a communication terminal identification number provided by the server.

21. A terminal in accordance with claim 20 wherein:

the wireless communication terminal initiates the session comprising a header in the earlier request indicating the data format which will be handled by the wireless communication terminal.

* * * * *